(12) United States Patent
Givargis et al.

(10) Patent No.: US 8,612,719 B2
(45) Date of Patent: Dec. 17, 2013

(54) METHODS FOR OPTIMIZING DATA MOVEMENT IN SOLID STATE DEVICES

(75) Inventors: Tony Digaleh Givargis, Irvine, CA (US); Mohammad Reza Sadri, Irvine, CA (US)

(73) Assignee: STEC, Inc., Santa Ana, CA (US)

(*) Notice: Subject to any disclaimer, the term of this patent is extended or adjusted under 35 U.S.C. 154(b) by 0 days.

(21) Appl. No.: 13/482,865

(22) Filed: May 29, 2012

(65) Prior Publication Data

US 2013/0024644 A1  Jan. 24, 2013

Related U.S. Application Data

(60) Provisional application No. 61/510,319, filed on Jul. 21, 2011.

(51) Int. Cl.
*G06F 12/08* (2006.01)

(52) U.S. Cl.
USPC ........... 711/203; 711/202; 711/206; 711/207; 711/E12.016

(58) Field of Classification Search
USPC ................ 711/202–203, 205–207, E12.016
See application file for complete search history.

(56) References Cited

U.S. PATENT DOCUMENTS

| | | | | |
|---|---|---|---|---|
| 6,751,757 B2* | 6/2004 | Biskup et al. | | 714/54 |
| 2005/0242928 A1* | 11/2005 | Kirkeby | | 340/286.07 |
| 2010/0161882 A1* | 6/2010 | Stern et al. | | 711/103 |
| 2011/0040950 A1* | 2/2011 | Handgen | | 711/206 |
| 2011/0276744 A1* | 11/2011 | Sengupta et al. | | 711/103 |

* cited by examiner

*Primary Examiner* — Jasmine Song
(74) *Attorney, Agent, or Firm* — Wilmer Cutler Pickering Hale and Dorr LLP

(57) ABSTRACT

Techniques for optimizing data movement in electronic storage devices are disclosed. In one particular exemplary embodiment, the techniques may be realized as a method for optimizing data movement in electronic storage devices comprising maintaining, on the electronic storage device, a data structure associating virtual memory addresses with physical memory addresses. Information can be provided regarding the data structure to a host which is in communication with the electronic storage device. Commands can be received from the host to modify the data structure on the electronic storage device, and the data structure can be modified in response to the received command.

20 Claims, 6 Drawing Sheets

METHODS FOR OPTIMIZING DATA MOVEMENT IN SOLID STATE DEVICES

CROSS-REFERENCE TO RELATED APPLICATIONS

This application claims priority to U.S. Provisional Application No. 61/510,319, filed Jul. 21, 2011, the entire disclosure of which is incorporated by reference herein in its entirety.

BACKGROUND

Memory devices are often used to store data provided by a host. In many situations, the host needs to reorganize previously-stored data from one location in the memory device to another location in the memory device. This reorganization may include move or copy operations, which may be used, for example, when the host is defragmenting the memory device.

A pointer is a programming data type whose value refers directly to ("points to") another value stored elsewhere in a computer memory using the value's memory address. A pointer references a location in memory, so the value of a pointer is the memory address of the underlying data, and not the data itself. Obtaining the underlying data at the memory address to which a pointer refers is known as "dereferencing" the pointer.

Modern computing systems support a memory management technique known as virtual memory. Virtual memory systems use two types of memory addresses to allow for data access: (1) virtual, or logical, addresses, and (2) physical addresses. A physical address represents a location of data stored on a directly addressable read/write memory (RAM). Before virtual memory systems were in use, any program could access and manipulate data in use by any other program, simply by referencing the physical address in memory of that data. Programs use virtual memory systems instead by referencing virtual addresses when they need to access data stored in memory. Virtual addresses are also known as logical addresses. Using virtual memory, programmers may design programs as if virtual memory is the only kind of memory, and which supports the same reading and writing operations as if it were directly addressable read/write memory. Furthermore, virtual memory systems simplify program design because programmers may design and implement programs as if the virtual memory is a contiguous working memory (an address space) to which the program has sole access. Therefore, programmers do not need to implement specialized modules to defragment working memory or to protect memory from use by other application processes.

To manage virtual memory, most storage devices, in particular SSDs, keep a virtual address to physical address (V2P) table of pointers. The virtual addresses are those issued by the host, and are used by the storage device as keys or indices into each row of the V2P table. Each row of the V2P table contains a physical address pointer that, in turn, points to the block of storage containing the data. These V2P tables are usually architecture-dependent and their implementation depends on the granularity of physical data access inside the storage device. The granularity of the physical data access refers to the fineness with which the storage device subdivides data blocks. For example, if an SSD is using physical block sizes of 16 kilobytes (KB), the V2P table assigns a virtual block number to each of the 16 KB physical blocks in the SSD.

Standard storage device interfaces, such as Serial Advanced Technology Attachment (SATA), Fibre Channel, and Serial Attached SCSI (SAS), do not define commands to trigger the memory device to perform pointer manipulations on its own based on logical addresses provided by the host. Accordingly, to reorganize data in the memory device, the host uses standard read and write commands in existing storage device interfaces. Specifically, the host sends a standard read command to the memory device via a bus and specifies a logical address of a source location in the memory. The memory device then translates the logical address to a physical address by looking up the logical address in the V2P table to find the associated physical address, reads the data from the source location, and sends the read data over the bus to the host. The host then stores the read data in a buffer and later sends the read data back to the memory device over the bus along with a standard write command that specifies a logical address of the destination location in the memory. As described above, the memory device then translates the destination location's logical address to a physical address and writes the data to the destination location's physical address.

There are several disadvantages associated with this process of reading from the device, buffering on the host, and writing data to the host. These disadvantages are reasons why reading and writing data is referred to as "costly" or "expensive" in terms of device performance. Because the host is involved in every step of the process, this process occupies the central processing unit (CPU) of the host, wastes power, blocks other user operations that otherwise could have been performed, and requires that the host contain a buffer to store read data. This process also ties up the communication bus between the host and the memory device since data is sent from the memory device to the host and then back to the memory device. Finally, it prevents the memory device management system from performing more sophisticated optimizations, such as avoiding the reading, buffering, and writing operations entirely and, instead, simply updating a table of pointers that map from the virtual or logical address space understood by the host to the physical address space understood by the storage device.

Ideally, reorganizing previously-stored data on the memory device should not require comparatively slow reading and re-writing of the data and, instead, should be accommodated by updating a table of pointers that are significantly faster to manipulate. For example, using current computing systems, a page of memory may take on the order of 100 microseconds to be written, or milliseconds to be erased. This means that a page of memory may take ten times as long to be erased as to be written. Although these durations may appear short, a table of pointers may be implemented in even faster memory including dynamic random-access memory (DRAM). As a result, updating rows in a table of pointers may take nanoseconds, which is 100,000 times faster than writing a page of memory.

While standard storage device interfaces do not define commands to trigger the memory device to perform a data reorganization operation on its own based on logical addresses provided by the host, a host can provide a command to some flash memory devices to reorganize data between physical addresses specified by the host. These commands would be performed on a raw flash physical device level (i.e., on the memory chip itself) and would be issued by the host.

SUMMARY OF THE DISCLOSURE

Techniques for optimizing data movement in electronic storage devices are disclosed. In one particular exemplary embodiment, the techniques may be realized as a method for optimizing data movement in electronic storage devices comprising maintaining, on the electronic storage device, a data structure associating virtual memory addresses with physical memory addresses. Information can be provided regarding the data structure to a host which is in communication with the electronic storage device. Commands can be received from the host to modify the data structure on the electronic storage device, and the data structure can be modified in response to the received command.

In accordance with other aspects of this particular exemplary embodiment, the techniques may include an electronic storage device which comprises at least one of: a solid state device, a hard drive, and a RAID array.

In accordance with additional aspects of this particular exemplary embodiment, the data structure may comprise a table mapping virtual memory addresses to physical memory addresses and the mapping is implemented using pointers.

In accordance with further aspects of this particular exemplary embodiment, the information regarding the data structure can be provided to the host via a Logical Block Number (LBN) translation query command, the Logical Block Number translation query command translating a host specific address to a Logical Block Number.

In accordance with further aspects of this particular exemplary embodiment, the information regarding the data structure may comprise at least one of: a total number of storage blocks, physical block granularity, storage block size, a number of rows in a table of the data structure, a number of pointers in the data structure, and a size of one or more pointers of the data structure.

In accordance with further aspects of this particular exemplary embodiment, the techniques may further include receiving a read command from the host specifying a virtual memory address associated with the data structure, and returning a physical memory address associated with the specified virtual memory address.

In accordance with further aspects of this particular exemplary embodiment, the read command may comprise a bulk read command accepting as input a range of virtual memory addresses and returning a corresponding range of physical memory addresses.

In accordance with further aspects of this particular exemplary embodiment, the command received from the host to modify the data structure may comprise a swap command. The swap command may contains as input a first specified virtual address pointer associated with the data structure and a second specified virtual address pointer associated with the data structure. Modifying the data structure in response to the received command may comprise associating the first specified virtual address pointer with a physical address pointer associated, prior to the swap command, with the second specified virtual address pointer; and associating the second specified virtual address pointer with a physical address pointer associated, prior to the swap command, with the first specified virtual address pointer.

In accordance with further aspects of this particular exemplary embodiment, the swap command may comprise a bulk swap command accepting as input a first range of specified virtual address pointers and a second range of specified virtual address pointers, the bulk swap command operative to swap physical address pointers associated with the first range of specified virtual address pointers with physical address pointers associated with the second range of specified virtual address pointers.

In accordance with further aspects of this particular exemplary embodiment, the command received from the host to modify the data structure may comprise a write command. The write command may contain as input a specified virtual address pointer associated with the data structure and a specified physical address pointer. Modifying the data structure in response to the received command may comprise associating the specified virtual addresses pointer with the specified physical address pointer in the data structure.

In accordance with further aspects of this particular exemplary embodiment, the write command may comprise a bulk write command containing as input a range of virtual address pointers and a list of physical address pointers. Modifying the data structure in response to the received command may comprise associating, in the data structure, each virtual address pointer in the range of virtual address pointers with a physical address pointer in the list of physical address pointers.

In accordance with further aspects of this particular exemplary embodiment, the command received from the host to modify the data structure may comprise a memory freeing operation. The memory freeing operation may contain as input a specified virtual address pointer associated with the data structure. Modifying the data structure in response to the received command may comprise disassociating the specified virtual addresses pointer from a currently associated physical address pointer in the data structure.

In accordance with further aspects of this particular exemplary embodiment, the host may accept memory freeing operation commands to free memory sizes of different levels of granularity.

In accordance with further aspects of this particular exemplary embodiment, the host may comprise at least one of: a computer, a mobile phone, a game device, a personal digital assistant (PDA), an email/text messaging device, a digital camera, a digital media (e.g., MP3) player, a GPS navigation device, and a TV system.

In accordance with further aspects of this particular exemplary embodiment, the data structure may be implemented in dynamic random-access memory (DRAM) of the electronic storage.

In accordance with further aspects of this particular exemplary embodiment, the techniques may further comprise storing, on the electronic storage device, a plurality of key-value pairs associated with a key-value store application; and receiving one or more commands to maintain a key-value pair.

In accordance with further aspects of this particular exemplary embodiment, the techniques may further comprise storing, on the electronic storage device, a plurality of journal log entries associated with a journaling file system; and receiving one or more commands to maintain a journal log entry.

In accordance with further aspects of this particular exemplary embodiment, the techniques may further comprise storing, on the electronic storage device, version data associated with a versioning system; and receiving a duplication command specifying a first virtual memory address pointer pointing a physical memory address, the duplication command providing a second virtual memory address pointer pointing to the physical memory address.

In accordance with further aspects of this particular exemplary embodiment, the techniques may include receiving a virtual pointer reassignment command specifying a first virtual memory address pointer specifying a first physical memory address and a second virtual memory address pointer specifying a second physical memory address. The second physical memory address may have been determined to be associated with data duplicate to that associated with the first physical memory address, and the virtual pointer reassignment command may set the second virtual memory address pointer to point to the first physical memory address.

In another particular exemplary embodiment, the techniques may be realized as a solid state device comprising electronic memory, a data structure configured to associate virtual memory addresses with physical memory addresses, and a memory controller. The memory controller may be configured to maintain the data structure associating virtual memory addresses with physical memory addresses and modify the data structure in response to a received command. The solid state device may also comprise a host interface configured to provide information regarding the data structure to a host. The host may be in communication with the solid state device and may receive a command from the host to modify the data structure.

In another particular exemplary embodiment, the techniques may be realized as an article of manufacture for improving data movement in an electronic storage device. the article of manufacture comprising at least one non-transitory processor readable storage medium, and instructions stored on the at least one medium. The instructions may be configured to be readable from the at least one medium by at least one processor and thereby cause the at least one processor to operate so as to maintain, in the electronic storage device, a data structure associating virtual memory addresses with physical memory addresses, receive a command from the host to modify the data structure, and modify the data structure in response to the received command.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

The present disclosure relates to a series of commands that allow a host to manipulate a set of pointers, where the set of pointers point to data that reside in a memory device, for example, a solid state device (SSD). The commands are implemented by the memory device which makes the commands available for use by the host software.

The additional commands can reduce data movement in applications such as, but not limited to, key-value store implementations, SSD-aware file system implementations, SSD-aware database design, and deduplication. These applications are discussed in further detail below.

Figure 1:
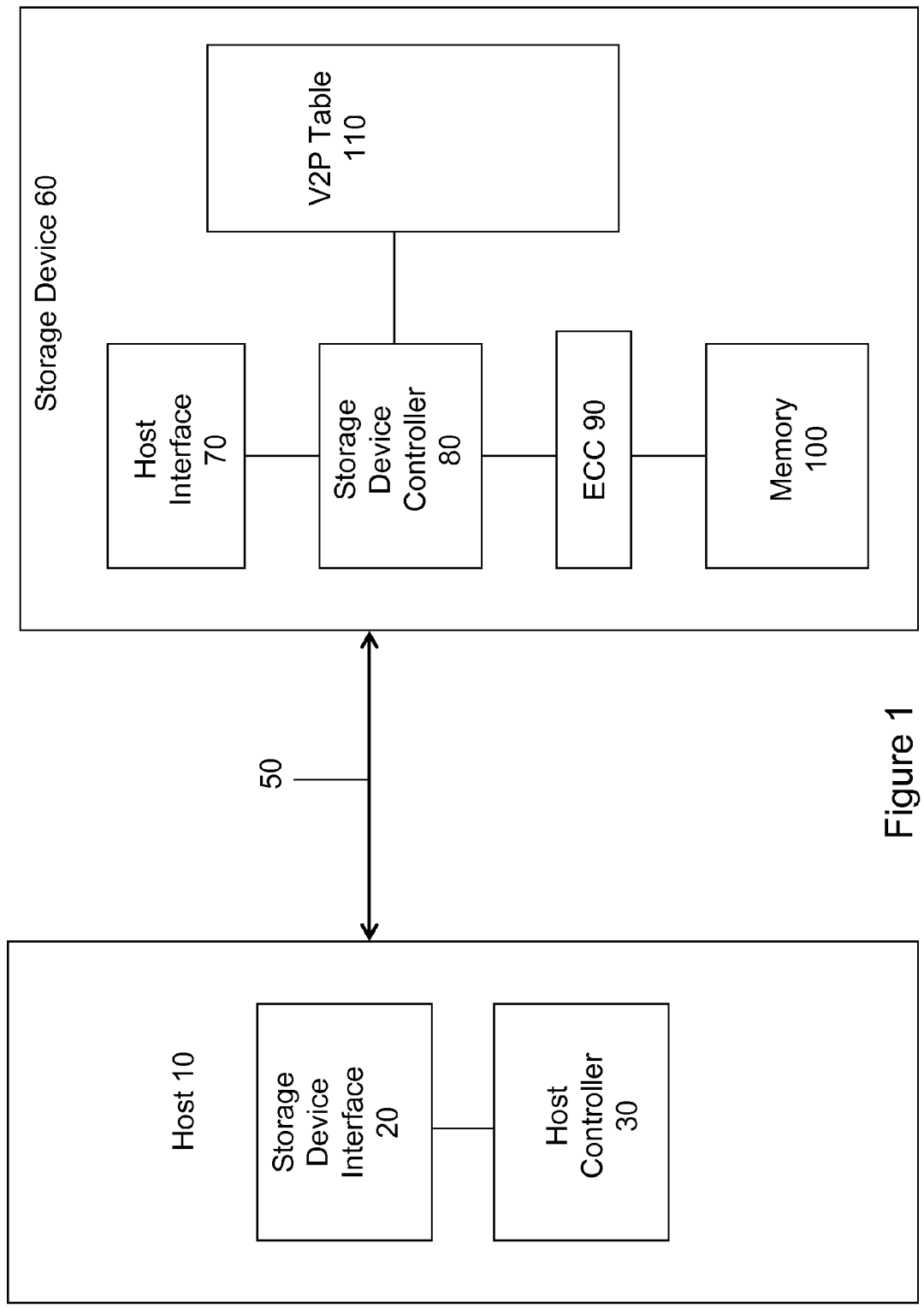
FIG. 1 shows an exemplary block diagram depicting a solid state device in communication with a host, in accordance with an embodiment of the present disclosure.

Turning now to the drawings, FIG. 1 is a block diagram of a host in communication with a memory device of an embodiment via a communication bus. FIG. 1 includes a number of computing technologies such as a host 10, a storage device interface 20, a host controller 30, a storage device 60, a host interface 70, a storage device controller 80, a V2P table 110, an ECC block 90, a memory 100, and a communication bus 50. The communication bus 50 can use any suitable interface standard including, but not limited to, Serial Advanced Technology Attachment (SATA), Advanced Technology Attachment (ATA), Small Computer System Interface (SCSI), Fibre Channel, Serial Attached SCSI (SAS), Secure Digital (SD), Embedded Multi-Media Card (EMMC), and Universal Flash Storage (UFS).

As used herein, the phrase "in communication with" means in direct communication with or in indirect communication with via one or more components named or unnamed herein (e.g., a memory card reader). The host 10 and the storage device 60 can be in communication with each other via a wired or wireless connection. For example, in one embodiment, the storage device 60 can comprise pins (or a socket) to mate with a corresponding socket (or pins) on the host 10 to establish an electrical and physical connection. In another embodiment, the storage device 60 comprises a wireless transceiver to place the host 10 and storage device 60 in wireless communication with each other.

The host 10 can take any suitable form, such as, but not limited to, a personal computer, a mobile phone, a game device, a personal digital assistant (PDA), an email/text messaging device, a digital camera, a digital media (e.g., MP3) player, a GPS navigation device, and a TV system. The storage device 60 can also take any suitable form, such as, but not limited to, a universal serial bus (USB) device, a memory card (e.g., an SD card), a hard disk drive (HDD), a solid state device (SSD), and a redundant array of independent disks (RAID). Also, instead of the host 10 and the storage device 60 being separately housed from each other, such as when the host 10 is a notebook computer and the storage device 60 is an SD card, the host 10 and the storage device 60 can be contained in the same housing, such as when the host 10 is a notebook computer and the storage device 60 is a hard disk drive (HDD) or solid-state device (SSD) internal to the housing of the computer.

As shown in FIG. 1, the host 10 of this embodiment comprises a storage device interface 20 and a host controller 30. In general, the storage device interface 20 is configured to send commands and to receive acknowledgments from the storage device 60 using the interface standard appropriate for the communication bus 50. The host controller 30 is operative to control various operations of the host 10. The memory 100 stores data for use by the host 10. The storage device 60 contains a host interface 70, which, complementary to the storage device interface 20 in the host 10, is configured to receive commands from and send acknowledgments to the host 10 using the interface standard appropriate for the communication bus 50. The storage device 60 also contains a storage device controller 80 operative to control various operations of the storage device 60, a virtual address to physical address (V2P) table 110 to translate virtual, or logical, addresses provided by the host 10 to physical addresses of the memory 100, an optional ECC block 90 to perform ECC operations, and the memory 100 itself. The V2P table 110 may also be known as a logical address to physical address (L-to-P) map.

The memory 100 can take any suitable form, such as, but not limited to, a solid-state memory (e.g., flash memory, or solid state device (SSD)), optical memory, and magnetic memory. While the memory 100 is preferably non-volatile, a volatile memory also can be used. Also, the memory 100 can be one-time programmable, few-time programmable, or many-time programmable. In one embodiment, the memory 100 takes the form of a raw NAND die; however, a raw NOR die or other form of solid state memory can be used.

The host 10 and the storage device 60 can include additional components, which are not shown in FIG. 1 to simplify the drawing. Also, in some embodiments, not all of the components shown are present. For example, when the storage device 60 takes the form of a HDD, instead of using a V2P table 110, the storage device controller 80 can use an allocation table, an algebraic mapping algorithm, or a defect mapping table to perform the translation. Further, the various controllers, blocks, and interfaces can be implemented in any suitable fashion. For example, a controller can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example.

Figure 2:
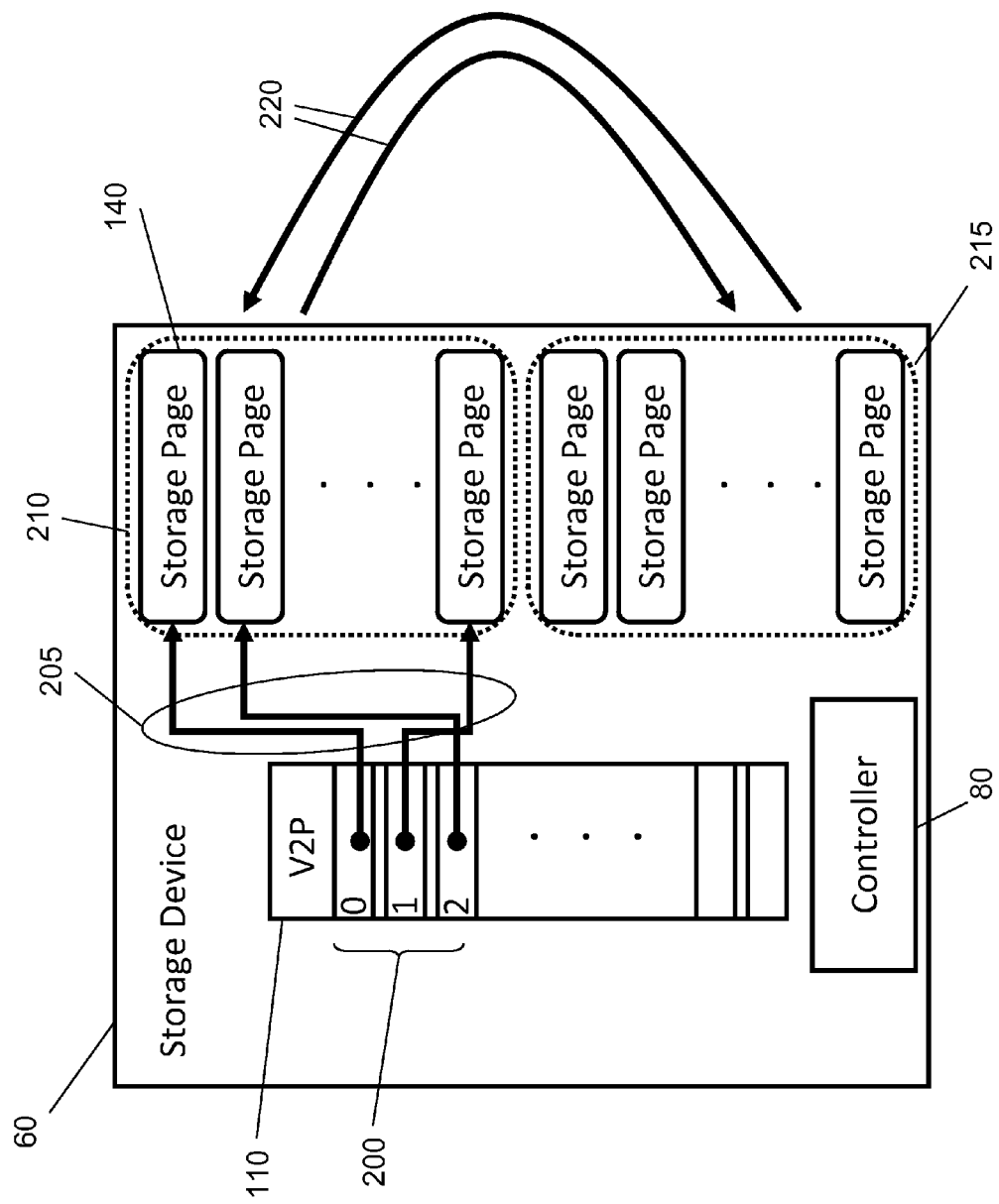
FIG. 2 depicts a exemplary block diagram of a solid state device mapping virtual addresses to physical addresses, in accordance with an embodiment of the present disclosure.

FIG. 2 illustrates a memory device with a storage device controller implementing a V2P table which maps virtual addresses to physical addresses in accordance with certain embodiments. FIG. 2 includes the storage device 60, the storage device controller 80, the V2P table 110, memory or storage pages 140, virtual addresses 200, physical addresses 205, allocated storage pages 210, and free storage pages 215. The storage device controller 80 running firmware in accordance with the present methods manages the storage device 60. As shown in FIG. 2, the V2P table 110 maps virtual addresses 200 to physical addresses 205. As described earlier, the V2P table 110 often resides in DRAM and can be updated in nanoseconds. Although the physical addresses 205 are shown conceptually in FIG. 2 as arrows, it will be understood to those of ordinary skill in the art that the physical addresses 205 may be actually numerical addresses similar to the virtual addresses 200. The pool of allocated storage pages 210 represents memory 100 which is in active use by the host 10 (illustrated in FIG. 1). The pool of free storage pages 215 represents a portion of memory 100 which is not in use by the host 10. Although these free storage pages 215 may have data remaining on them, the free storage pages 215 are not in use by any application or process on the host 10. As shown by the arrows 220, the storage device controller 80 may move pages to and from the pool of allocated pages 210 and the pool of free storage pages 215.

Commands

The additional commands described herein include a logical block number (LBN) translation query command, a comprehensive query command, an LBN pointer exchange (or swap) command, an invalidate (or clear) command, a read command, a write command, and "bulk" versions of these commands. By providing these additional commands, a well-designed application running on the host can leverage the speed improvements associated with direct pointer manipulations to avoid the performance cost and overhead incurred by reading, buffering, and writing the associated data instead.

The LBN translation query command allows the host to query the memory device for device-specific parameters, such as the device's physical page size or physical block size, or any alignment restrictions in specifying the LBN source and destination address. The host can then use the information returned by the LBN translation query command to translate a host-specific address, for example a logical block address (LBA) or a file offset, to an LBN.

The comprehensive query command returns information on the V2P size or total number of storage blocks, physical block granularity or storage block size, number of rows in the V2P table or total number of pointers, the size of each pointer, and any other constraints or restrictions. For example, the host issues a V2P comprehensive query command and the storage device responds with 1M and 16K. The host understands from this output of the V2P comprehensive query command that the storage device can accommodate 1 million blocks of size 16 kilobytes.

Subsequently, the storage device may respond to a series of commands that are specifically designed to manipulate the content of the V2P.

The read-V2P command allows the host to specify as input a virtual address pointer representing a row in the V2P table, with the effect of returning the physical address pointer associated with the virtual address pointer.

The write-V2P command allows the host to specify as input a virtual address pointer representing a row in the V2P table, and a new physical address pointer value, with the effect of updating the V2P table to associate the new physical address pointer with the input virtual address pointer. If the old memory page pointed to by the physical address pointer is free as a result, the old memory page may be freed or reclaimed to be used for fresh data writes.

Figure 3A:
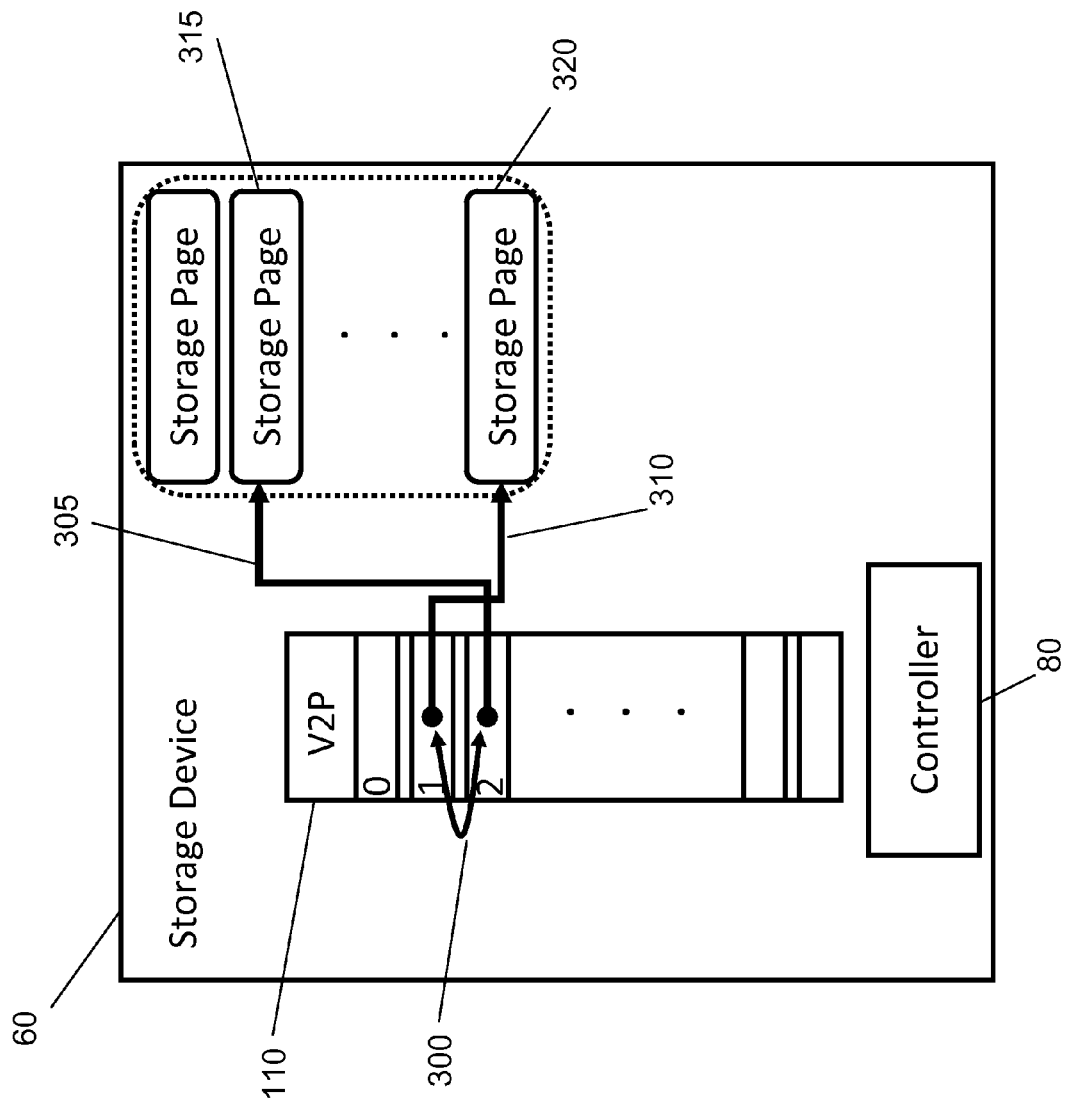
FIG. 3A shows an exemplary block diagram depicting a solid state device during a pointer exchange operation, in accordance with an embodiment of the present disclosure.
Figure 3B:
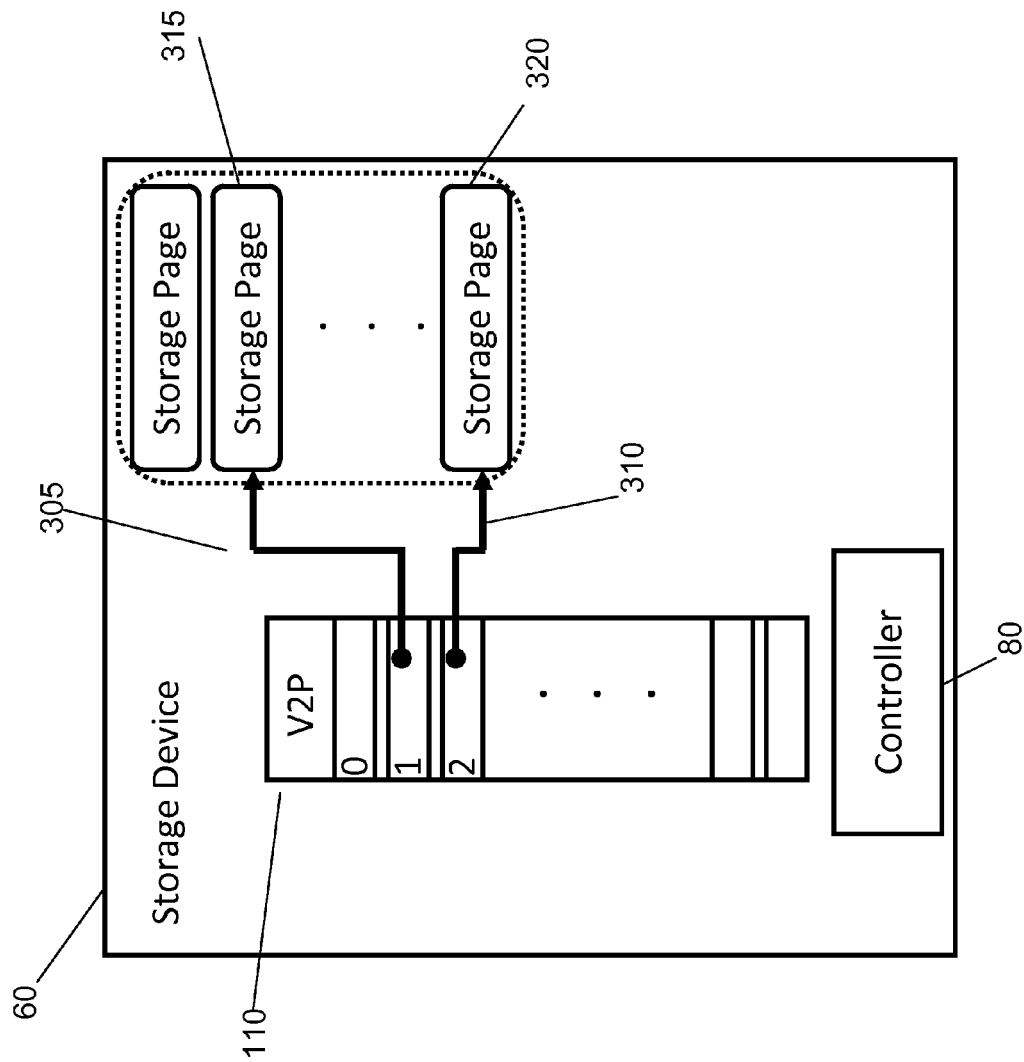
FIG. 3B shows an exemplary block diagram depicting a solid state device after a pointer exchange operation, in accordance with an embodiment of the present disclosure.

FIGS. 3A and 3B illustrate a memory device performing the LBN pointer exchange, or swap-V2P, command in accordance with certain embodiments. FIGS. 3A and 3B illustrate the storage device 60, the storage device controller 80, the V2P table 110, the swap command 300, the first physical address pointer 305 referencing the first storage page 315, and the second physical address pointer 310 referencing the second storage page 320. The LBN pointer exchange, or swap-V2P, command allows the host to swap the physical address pointer at one row of the V2P table with the physical address pointer at another row. Initially, the storage device 60 has V2P table 110 containing virtual address 1 and virtual address 2. Virtual address 2 is associated with the physical address pointer 305, and virtual address 1 is associated with the physical address pointer 310. The storage device 60 receives a command to swap virtual address 1 and virtual address 2, shown by arrow 300. FIG. 3B illustrates the result of the swap-V2P command in accordance with certain embodiments. After receiving a logical block number (LBN), or virtual address pointer, from the SSD, the host can send the LBN pointer exchange command to the SSD to use a different LBN to represent the physical address data pointed to by the received LBN. As shown in FIG. 3B, a different LBN, virtual address 1, is now associated with physical address pointer 305, and virtual address 2 is now associated with physical address pointer 310. The first physical address pointer 305 continues to reference the first storage page 315, and the second physical address pointer 310 continues to reference the second storage page 320. Therefore, this command allows the host 10 to directly modify the mapping on the SSD.

Figure 4A:
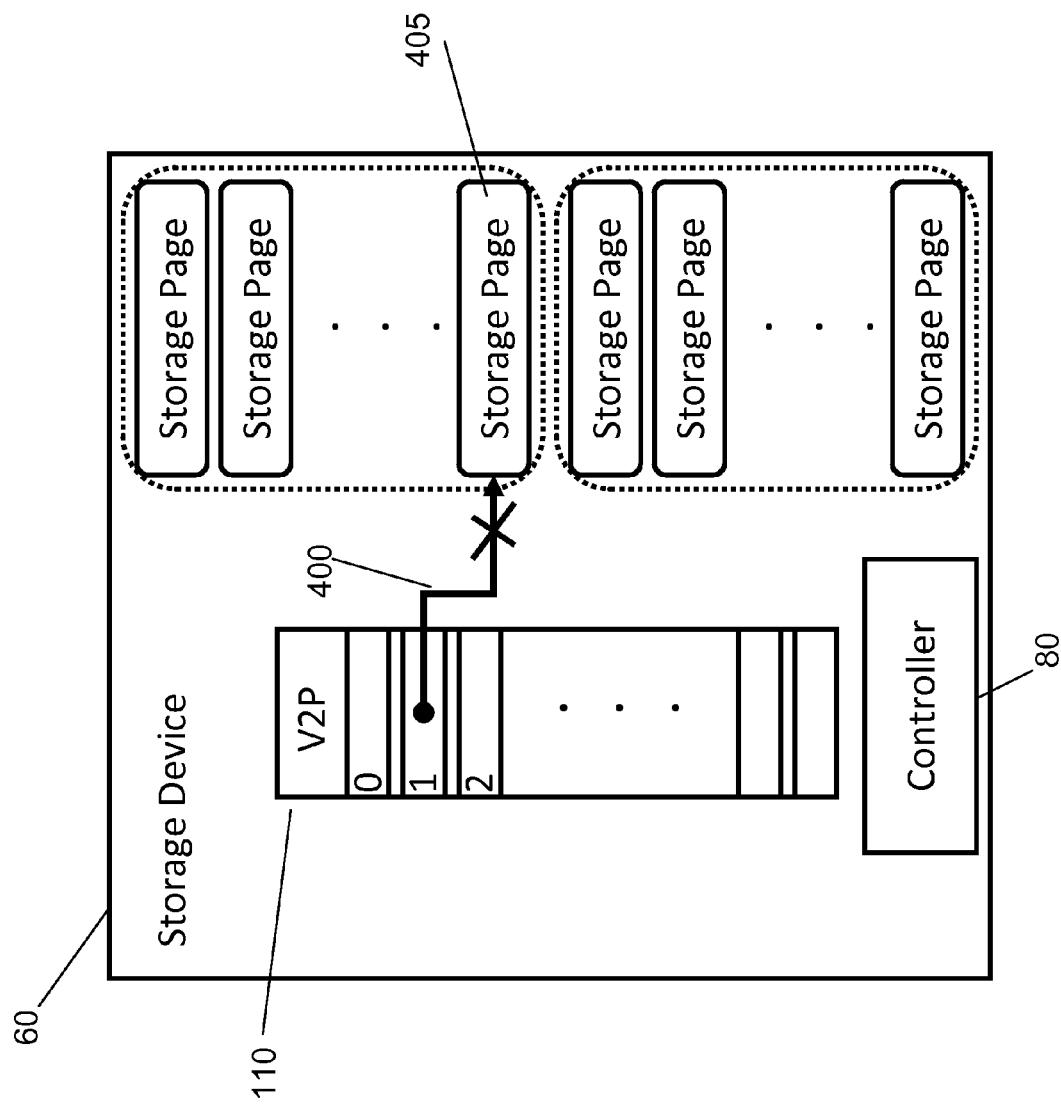
FIG. 4A shows an exemplary block diagram depicting a solid state device during a pointer clearing operation, in accordance with an embodiment of the present disclosure.
Figure 4B:
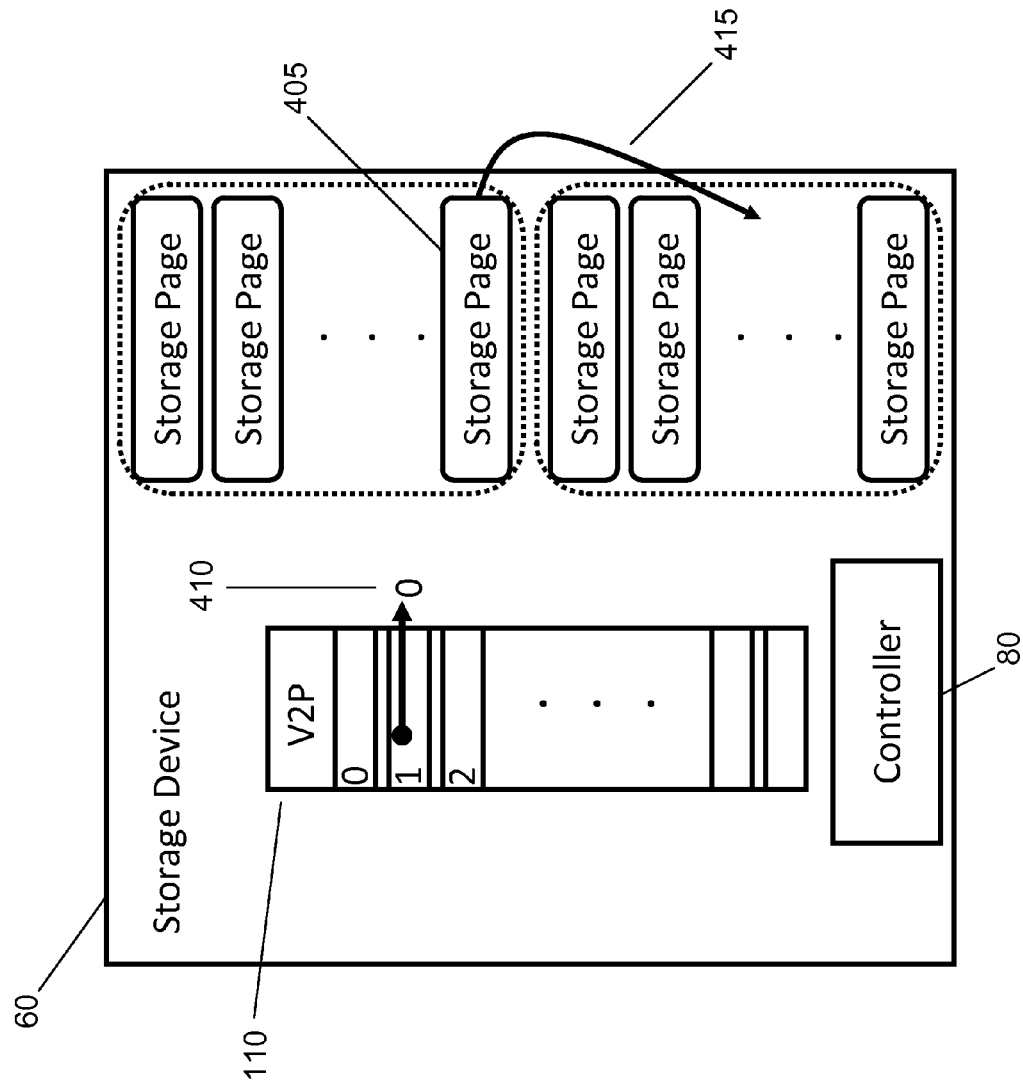
FIG. 4B shows an exemplary block diagram depicting a solid state device after a pointer clearing operation, in accordance with an embodiment of the present disclosure.

FIGS. 4A and 4B illustrate a block diagram of a memory device performing the invalidate, or clear-V2P, command in accordance with certain embodiments. FIGS. 4A and 3B illustrate the storage device 60, the storage device controller 80, the V2P table 110, a physical address pointer 400 referencing a storage page 405, and a memory free operation 415. The invalidate, or clear-V2P, command accepts as input a virtual address pointer representing a row in a V2P table, and zeroes out the physical address associated with the virtual address pointer, with the result that subsequent reads of the virtual address pointer return 0. As shown in FIG. 4A, the virtual address 1 is associated with physical address pointer 400. As shown in FIG. 4B, the storage device 60 has carried out the clear-V2P command. The previously pointed-to block 405 can be freed or reclaimed to be used for fresh data writes. The storage device controller 80 may erase the page or return the page to the free pool, as shown by arrow 415. The physical page may be marked, by the SSD or by the host, for reclaiming via garbage collection. Subsequent reads of the virtual address 1 return the value 0, as indicated by element 410. The invalidate command can help reduce write amplification caused by lack of flash translation layer (FTL) knowledge about an application. Write amplification is a phenomenon associated with flash memory and SSDs. Write amplification is an issue because flash memory in general has a limited lifetime based on the number of reads and writes required of the memory. Because flash memory must be erased before it can be rewritten, the process to perform these operations results in moving or rewriting user data and metadata more than once. This multiplying effect increases the number of writes required over the life of the SSD which shortens the lifetime over which it can reliably operate. The increased writes also consume bandwidth to the flash memory which reduces random write performance to the SSD. The granularity of an invalidate command can be at the super-block or block level.

Other commands may include bulk V2P manipulation commands, otherwise similar to the commands described above. A bulk-V2P-write command may be issued by the host, specifying as input the starting V2P virtual address pointer table row, an integer number of subsequent consecutive rows, and a list of physical address pointer values to be modified. A bulk-V2P-read command may also be issued by the host, specifying as input the starting V2P virtual address table row, and an integer number of subsequent consecutive rows to be read. A bulk-V2P-swap command may be issued by the host, specifying as input two sets of V2P virtual address ranges to be swapped. A bulk V2P-clear command may be specified to clear an input range of V2P virtual address pointers.

Potential Applications of Commands

The disclosed commands have many potential applications in memory devices, including but not limited to: key value Stores, journaling and log structure file systems, file system or block-level snapshot implementations, and deduplication.

A key-value store is a database system where each "value" to be stored is associated with a unique "key." The basic operations of a key-value store are insert and lookup commands. An insert command is issued to store the key-value pairs on the storage device. A lookup command is issued to retrieve the value associated with a specified key, if the key and value exist. A key-value system must be able to insert and look up key-value pairs in a time-efficient manner. Ideally, key-value pairs are stored and maintained in sorted order by key on the storage device. Algorithmically, inserting and looking up keys within a sorted sequence is substantially faster in time than performing the same operations on an unsorted sequence. However, in order to maintain a sequence of key-value pairs in sorted order, it is necessary to reorganize the existing data when new key-value pairs are being inserted. If the data resides on a storage device, and a V2P table of pointers is used, a host key-value store application can use the present methods to instruct the SSD to manipulate the pointers, to maintain a sorted sequence of key-value pairs without physically reading or re-writing data on the storage blocks.

In journaling and log-structured file systems, data is written to a storage device in a journaling, i.e., sequential, order. When a file or directory is removed or deleted, the journaling or log-structured file systems mark the remove or delete by writing a note at the end of the sequence. Periodically the journaling or log-structured file system must reorganize the log to exclude the data associated with removed or deleted files and directories. In many implementations, the journaling or log-structured file system starts by reading the old sequence and writing a new sequence, skipping deleted items. This implementation is expensive from a performance standpoint, in particular on SSDs where rewrites have a high cost to performance and life expectancy of the memory device. Using the commands outlined in this disclosure, the journaling or log-structured file system can manipulate the V2P pointers in a much better-performing manner to defragment journal or log data.

Versioning systems allow a user to store changed incremental versions of a file in a space-efficient manner. For example, a document management system might use a versioning system to allow users to create new versions of documents to make changes but still be able to access, compare, and revert to previous document versions. A source code control system might use a versioning system to allow programmers to save different versions of incremental changes to different source code modules, rather than saving complete new copies of the source code modules with each change, to allow programmers to track feature implementations or bug fixes. A backup system might use a versioning system to store incremental changes to files for daily backups, rather than storing complete duplicate copies of a file. In versioning systems, cloning data normally requires duplicating the data. Using the present methods, a host can implement a versioning system in a time- and space-efficient manner by making two virtual addresses point to the same data, that is two rows of the V2P table point to the same physical storage block. A host can implement such a versioning system using a copy-on-write design. A copy-on-write design is an efficient mechanism for a host application to support versioning and cloning. Upon creating a new version, one inefficient approach is for a host to clone the data for every new version. For each new version, this approach requires an amount of space equal to the size of the data being cloned. Instead under a copy-on-write design, a host application can refer to a new version by creating a new virtual address pointer to the same physical address. At this point, two virtual address pointers are associated with the same physical address pointer. When a user wants to save a change to the new version, only then does the host need to duplicate the data and make the two pointers point to separate storage blocks. By using the present methods in this manner, the host application can implement a versioning system using a space-efficient copy-on-write design.

In deduplication, a host tries to address the problem of finding duplicate data, typically with the goal of improving storage utilization. A host might have an algorithm for detecting that two blocks of data are identical. In these instances, the host may increase the efficiency of memory storage by pointing two distinct V2P virtual addresses to the same physical address storage block, which allows the underlying duplicate data at the duplicate physical address storage block to be freed, reclaimed, and reused.

With the general method now described, the following paragraphs present details on various formats that can be used. It should be noted that these details are merely examples. It is also contemplated that some of these formats can be added as a new communication protocol command to an existing interface standard, such as ATA/SCSI, SATA, SCSI (T10), USB 3.0, or SD 3.0, for example. Alternatively, these commands can be vendor-unique features.

One format issue relates to whether to specify an amount of data to handle in the operation. As mentioned above, the command from the host 10 identifies as parameters the logical addresses of the source and destination locations (e.g., the "from sector" and "to sector").

In addition to specifying the logical addresses of the source and destination locations, the commands can accept as input an amount of data (e.g., a number of sectors) to handle from the starting address. Alternatively, the amount of data to be handled from a given location can be configured as a default parameter, so there would be no need for the host 10 to specify an amount of data to handle. For example, if the storage device 60 operates on a single-sector or single-page basis, the storage device 60 can define and implement the present methods such that the default value for the amount of data is a single sector or a single page.

Another format issue relates to the disposition of the data at the source location after the data is written to the destination location. For example, in a typical copy operation, the data remains in the source location, whereas in a typical move operation, some action may or may not be taken with respect to the data in the source location. In one embodiment, the command itself specifies a disposition of the data at the source location. For example, the command can include a parameter (e.g., a flag in the command string) that specifies the disposition of the data at the source location. In another embodiment, the disposition of the data at the source location is implicit in the command's schematic. For example, a "COPY SECTORS" command can be defined such that the semantics of the command itself implies that the original sectors of data are to remain undisturbed after the data is written to the destination location. Similarly, a "MOVE SECTORS" command can be defined such that the semantics of the command itself implies that some action is to be taken (e.g., logically delete the data in the source sectors) after the data is written to the destination location.

As noted above, disposition of the data at the source location can take various forms. For example, one type of disposition is to leave the data at the source location as-is. This type of disposition is consistent with what is typically considered a "copy" operation, since the data at the source location is left intact. Another type of disposition is to physically erase (e.g., either as a simple, one-pass erase or as a multi-pass secure erase) the data at the source location (e.g., by overwriting the data at the source location with zeroes). This type of disposition is consistent with what is typically considered a "move" or "cut-and-paste" operation, since the data at the source location is removed. This type of disposition may be preferred in security environments, where it is desired to avoid leaving data "residue" behind. Yet another type of disposition is to logically delete the data at the source location, which is referred to as "trimming." With this type of disposition, the data at the source location is not physically erased, but an entry for the data in an allocation table or metadata for the file is marked as deleted, as invalid, or as unwritten. In this way, the trimmed sectors can be ignored in a reclaiming or garbage collection cycle, so they do not have to be moved. Because the data at the location is not physically erased, it can later be reclaimed, if desired. While either deleting or trimming can be used in certain types of memory devices, such as solid-state devices or other types of flash memory devices, trimming may not be an available option with memory devices that do not have an allocation table, such as hard disk drives. As yet another example of disposition types, a command can indicate a "don't care" condition for the data at the source location. A "don't care" condition indicates that the disposition of the data may be any of the dispositions described earlier, including leaving the data intact, deleting the data, or trimming the data.

A host can choose to use the present commands in any suitable situation. For example, a host can issue the present commands in conjunction with a reclaiming or garbage collection operation, or a wear leveling operation. In this way, the memory device can decide to wait to execute the command until it performs internal reclaiming garbage collection or wear leveling tasks. As another example, a host can issue the present commands as part of a disk defragmentation operation. On memory devices, such as hard disk drives, "white space" is left in the memory over time because copying or deleting files of different sizes or appending a file can create multiple fragments. Disk defragmentation puts all logical pieces of data physically together to eliminate the "white space" in the memory. A host can issue the present commands as part of the disk defragmentation operation to accelerate this operation. In this way, a solid-state device can optimize the execution of either a copy command or a move command by combining it with a wear leveling or reclaiming garbage collection operation performed by the solid-state device as part of its internal operations. For example, if the source data is located in the middle of a block but a range of sectors is moved or copied, a space allocator in the storage device controller can re-align these sectors to the start of a block (with a move command, the source range can be trimmed or deleted). Because copy operations are performed frequently on a solid-state device, the host may use the present methods to boost performance.

As other examples, a host can issue the present commands as part of a file system copy operation (e.g., when copying from one sub-directory to another without involving the host), as part of a file open or copy-on-write operation (e.g., copying a file when it is opened, writing to the copy instead of to the original file, and committing the copy and erasing the old one upon a save operation (if the copy is closed without saving, the copy is not kept)), or as part of a backup operation (e.g., making a logical copy of everything in all or part of the memory).

There are many alternatives that can be used with these embodiments. For example, while hard disk drives and solid state devices were discussed in the forgoing examples, as noted above, any type of suitable memory device can be used. Further, these embodiments can be used in a RAID subsystem to achieve similar advantages in optimizing performance and resource utilization, while taking advantage of efficiencies in RAID parity calculations and the number of physical I/Os performed. Accordingly, these embodiments can be used to make RAID controllers and subsystems more efficient.

The invention claimed is:

1. A method for improving data movement in an electronic storage device comprising:
    maintaining, using the electronic storage device, a data structure associating virtual memory addresses with physical memory addresses;
    providing information regarding the data structure to a host, the host in communication with the electronic storage device;

receiving a command from the host to modify the data structure, wherein the command received from the host to modify the data structure comprises a swap command which contains as input a first specified virtual address pointer associated with the data structure and a second specified virtual address pointer associated with the data structure; and modifying the data structure in response to the received command, wherein modifying the data structure in response to the received command comprises:

associating the first specified virtual address pointer with a physical address pointer associated, prior to the swap command, with the second specified virtual address pointer; and associating the second specified virtual address pointer with a physical address pointer associated, prior to the swap command, with the first specified virtual address pointer.

2. The method according to claim 1, wherein the electronic storage device comprises at least one of: a solid state device, a hard drive, and a RAID array.

3. The method according to claim 1, wherein the data structure comprises a table mapping virtual memory addresses to physical memory addresses and the mapping is implemented using pointers.

4. The method according to claim 1, wherein the information regarding the data structure is provided to the host via a Logical Block Number (LBN) translation query command, the Logical Block Number translation query command translating a host specific address to a Logical Block Number.

5. The method according to claim 1, wherein the information regarding the data structure comprises at least one of: a total number of storage blocks, physical block granularity, storage block size, a number of rows in a table of the data structure, a number of pointers in the data structure, and a size of one or more pointers of the data structure.

6. The method according to claim 1, further comprising:
receiving a read command from the host specifying a virtual memory address associated with the data structure; and
returning a physical memory address associated with the specified virtual memory address.

7. The method according to claim 6, wherein the read command comprises a bulk read command accepting as input a range of virtual memory addresses and returning a corresponding range of physical memory addresses.

8. The method according to claim 1, wherein the swap command comprises a bulk swap command accepting as input a first range of specified virtual address pointers and a second range of specified virtual address pointers, the bulk swap command operative to swap physical address pointers associated with the first range of specified virtual address pointers with physical address pointers associated with the second range of specified virtual address pointers.

9. The method according to claim 1, wherein the command received from the host to modify the data structure comprises a write command which contains as input a specified virtual address pointer associated with the data structure and a specified physical address pointer, and wherein modifying the data structure in response to the received command comprises associating the specified virtual addresses pointer with the specified physical address pointer in the data structure.

10. The method according to claim 9, wherein the write command comprises a bulk write command containing as input a range of virtual address pointers and a list of physical address pointers, wherein modifying the data structure in response to the received command comprises associating, in the data structure, each virtual address pointer in the range of virtual address pointers with a physical address pointer in the list of physical address pointers.

11. The method according to claim 1, wherein the command received from the host to modify the data structure comprises a memory freeing operation which contains as input a specified virtual address pointer associated with the data structure, wherein modifying the data structure in response to the received command comprises disassociating the specified virtual addresses pointer from a currently associated physical address pointer in the data structure.

12. The method according to claim 11, wherein the host accepts memory freeing operation commands to free memory sizes of different levels of granularity.

13. The method according to claim 1, wherein the host comprises at least one of: a computer, a mobile phone, a game device, a personal digital assistant (PDA), an email/text messaging device, a digital camera, a digital media (e.g., MP3) player, a GPS navigation device, and a TV system.

14. The method according to claim 1, wherein the data structure is implemented in dynamic random-access memory (DRAM) of the electronic storage.

15. The method according to claim 1, further comprising:
storing, on the electronic storage device, a plurality of key-value pairs associated with a key-value store application; and
receiving one or more commands to maintain a key-value pair.

16. The method according to claim 1, further comprising:
storing, on the electronic storage device, a plurality of journal log entries associated with a journaling file system; and
receiving one or more commands to maintain a journal log entry.

17. The method according to claim 1, further comprising:
storing, on the electronic storage device, version data associated with a versioning system; and
receiving a duplication command specifying a first virtual memory address pointer pointing a physical memory address, the duplication command providing a second virtual memory address pointer pointing to the physical memory address.

18. The method according to claim 1, further comprising:
receiving a virtual pointer reassignment command specifying a first virtual memory address pointer specifying a first physical memory address and a second virtual memory address pointer specifying a second physical memory address, wherein the second physical memory address has been determined to be associated with data duplicate to that associated with the first physical memory address, and wherein the virtual pointer reassignment command sets the second virtual memory address pointer to point to the first physical memory address.

19. A solid state device comprising:
electronic memory;
a data structure configured to associate virtual memory addresses with physical memory addresses;
a memory controller configured to:
maintain the data structure associating virtual memory addresses with physical memory addresses;
modify the data structure in response to a received command, wherein the command received from the host to modify the data structure comprises a swap command which contains as input a first specified virtual address pointer associated with the data structure and a second specified virtual address pointer associated with the data structure, and wherein modifying the data structure in response to the received command comprises:

associating the first specified virtual address pointer with a physical address pointer associated, prior to the swap command, with the second specified virtual address pointer; and associating the second specified virtual address pointer with a physical address pointer associated, prior to the swap command, with the first specified virtual address pointer; and a host interface configured to:

provide information regarding the data structure to a host, the host in communication with the solid state device;

receive the command from the host to modify the data structure.

20. An article of manufacture for improving data movement in an electronic storage device, the article of manufacture comprising:

at least one non-transitory processor readable storage medium; and instructions stored on the at least one medium;

wherein the instructions are configured to be readable from the at least one medium by at least one processor and thereby cause the at least one processor to operate so as to:

maintain, in the electronic storage device, a data structure associating virtual memory addresses with physical memory addresses;

receive a command from the host to modify the data structure, wherein the command received from the host to modify the data structure comprises a swap command which contains as input a first specified virtual address pointer associated with the data structure and a second specified virtual address pointer associated with the data structure; and modify the data structure in response to the received command, wherein modifying the data structure in response to the received command comprises:

associating the first specified virtual address pointer with a physical address pointer associated, prior to the swap command, with the second specified virtual address pointer; and associating the second specified virtual address pointer with a physical address pointer associated, prior to the swap command, with the first specified virtual address pointer.

* * * * *